(12) United States Patent
Chang et al.

(10) Patent No.: US 11,846,752 B1
(45) Date of Patent: Dec. 19, 2023

(54) HEAD-MOUNTED DISPLAY DEVICE WITH ADJUSTABLE INTERPUPILLARY DISTANCE

(71) Applicant: HTC Corporation, Taoyuan (TW)

(72) Inventors: Li-Hsun Chang, Taoyuan (TW); Kuan-Ying Ou, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/985,155

(22) Filed: Nov. 11, 2022

(51) Int. Cl.
*G02B 27/01* (2006.01)

(52) U.S. Cl.
CPC .. *G02B 27/0176* (2013.01); *G02B 2027/0159* (2013.01); *G02B 2027/0163* (2013.01); *G02B 2027/0169* (2013.01)

(58) Field of Classification Search
CPC ........ G02B 27/0176; G02B 2027/0159; G02B 2027/0163; G02B 2027/0169
See application file for complete search history.

(56) References Cited

U.S. PATENT DOCUMENTS

| 10,819,898 | B1 * | 10/2020 | Han | G02B 27/017 |
| 2019/0346682 | A1 | 11/2019 | Kang et al. | |
| 2020/0341283 | A1 * | 10/2020 | McCracken | G02B 27/0172 |
| 2021/0208364 | A1 * | 7/2021 | Chen | G02B 7/12 |
| 2021/0302745 | A1 * | 9/2021 | Mutlu | G03B 17/12 |
| 2022/0236566 | A1 | 7/2022 | Kim et al. | |

FOREIGN PATENT DOCUMENTS

| CN | 113940055 | 1/2022 |
| CN | 114114690 | 3/2022 |
| CN | 114600033 | 6/2022 |

OTHER PUBLICATIONS

"Office Action of Taiwan Counterpart Application", dated Oct. 4, 2023, p. 1-p. 6.

* cited by examiner

*Primary Examiner* — Kwang-Su Yang
(74) *Attorney, Agent, or Firm* — JCIPRNET

(57) ABSTRACT

A head-mounted display device includes a base, a first lens, a second lens, a first shape memory alloy (SMA) element, and a braking element. The first lens and the second lens are movably disposed on the base. The first SMA element is connected between the base and the first lens or connected between the second lens and the first lens, and is used to move the first lens and adjust a distance between the first lens and the second lens. The braking element is disposed on the base. The braking element brakes the first lens at a braking position. The braking element is separated from the first lens at a movable position.

11 Claims, 4 Drawing Sheets

HEAD-MOUNTED DISPLAY DEVICE WITH ADJUSTABLE INTERPUPILLARY DISTANCE

BACKGROUND

Technical Field

The application relates to a head-mounted display device. Particularly, the application relates to a head-mounted display device with an adjustable interpupillary distance.

Description of Related Art

With the rapid advancement of technology currently, the types and functions of head-mounted display devices are also increasingly diversified on a daily basis. Taking a head-mounted display device in an eye-mask form as an example, when a user wears such a device, a gyroscope and a position tracker inside the head-mounted display device track a movement status of the user to project a picture of the corresponding scene, providing the user with an experience as if in a virtual world.

During use of the head-mounted display device, since each user has a different interpupillary distance, a distance between two lenses in the head-mounted display device is required to be adjustable, so that each user can gain the optimal use experience. At present, the distance between the two lenses of the head-mounted display device are mainly adjusted manually. However, it is not certain that each user can adjust the two lenses to an appropriate position.

SUMMARY

The application provides a head-mounted display device to provide a function of electrically adjusting an interpupillary distance.

The head-mounted display device of the application includes a base, a first lens, a second lens, a first shape memory alloy element (SMA element), and a braking element. The first lens and the second lens are movably disposed on the base. The first SMA element is connected between the base and the first lens or connected between the second lens and the first lens, and is used to move the first lens and adjust a distance between the first lens and the second lens. The braking element is disposed on the base. The braking element brakes the first lens at a braking position. The braking element is separated from the first lens at a movable position.

Based on the foregoing, in the head-mounted display device of the application, the first SMA element may be used to adjust the interpupillary distance, and the braking element may also be used to fix the interpupillary distance, so the function of electrically adjusting the interpupillary distance can be provided.

DESCRIPTION OF THE EMBODIMENTS

Figure 1:
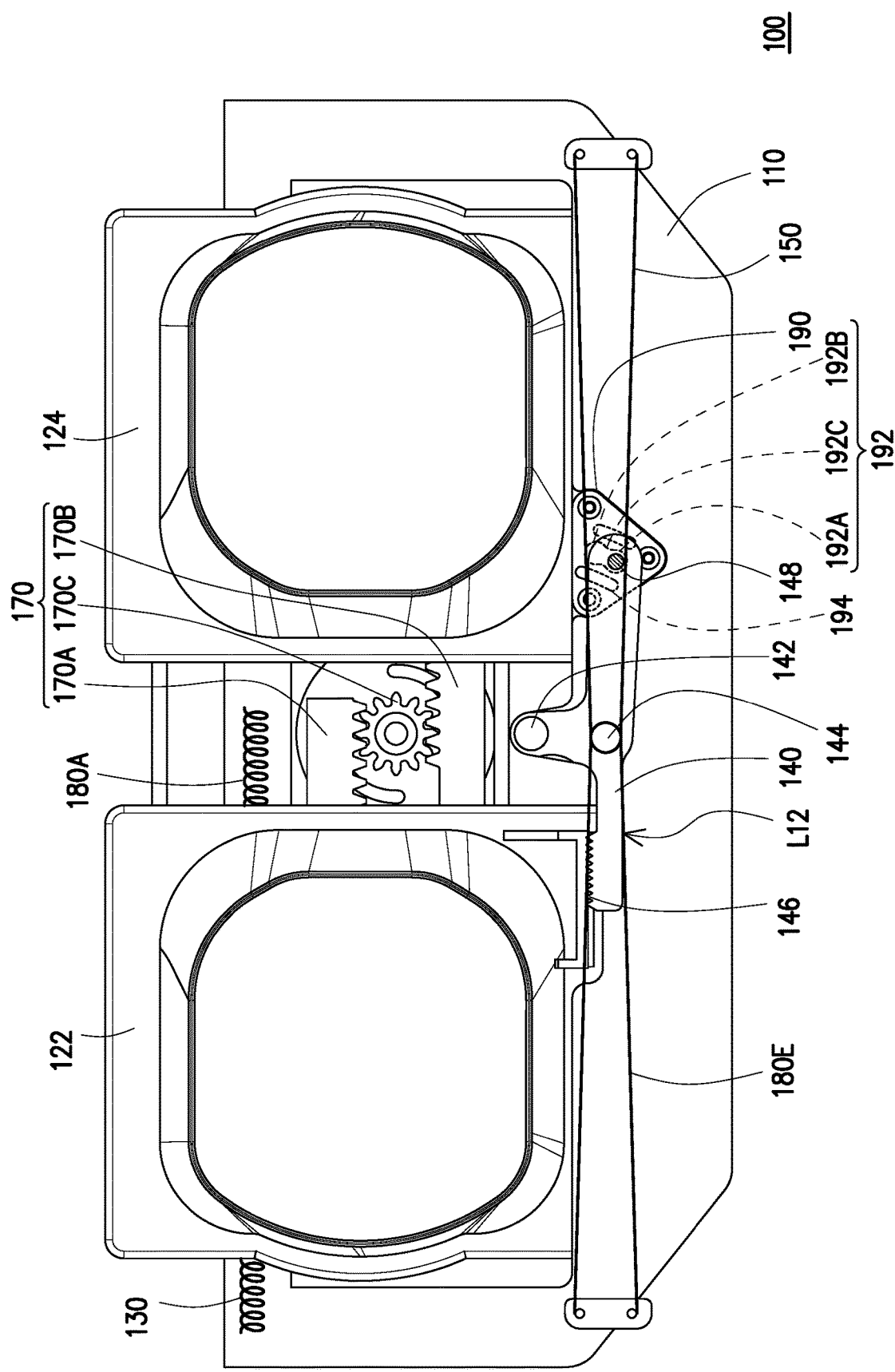
FIG. 1 is a schematic diagram of a head-mounted display device of an embodiment of the invention in a braking state.

FIG. 1 is a schematic diagram of a head-mounted display device of an embodiment of the invention in a braking state. With reference to FIG. 1, in this embodiment, a head-mounted display device 100 includes a base 110, a first lens 122, a second lens 124, a first shape memory alloy element (SMA element) 130, and a braking element 140. The first lens 122 and the second lens 124 are movably disposed on the base 110. The first SMA element 130 is connected between the base 110 and the first lens 122 or connected between the second lens 124 and the first lens 122. The first SMA element 130 is used to move the first lens 122 and adjust a distance between the first lens 122 and the second lens 124. The braking element 140 is disposed on the base 110. The braking element 140 brakes the first lens 122 at a braking position L12. Accordingly, in the state of FIG. 1, the first lens 122 is not movable, and a fixed interpupillary distance may be maintained.

Figure 2:
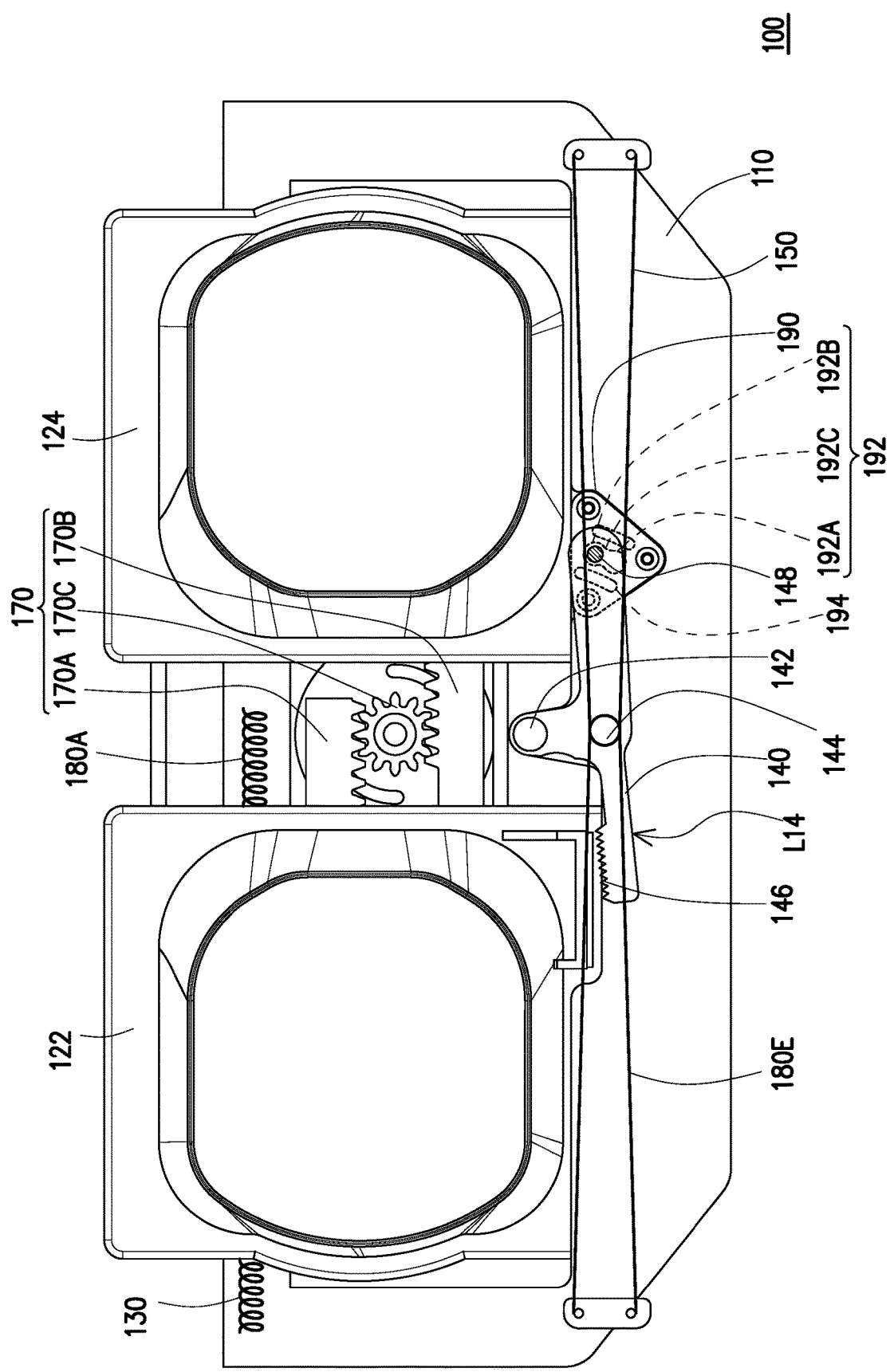
FIG. 2 is a schematic diagram of a head-mounted display device of FIG. 1 in a movable state.

FIG. 2 is a schematic diagram of a head-mounted display device of FIG. 1 in a movable state. With reference to FIG. 1 and FIG. 2, the braking element 140 is separated from the first lens 122 at a movable position L14. Accordingly, in the state of FIG. 2, the first lens 122 is movable, and the interpupillary distance can be adjusted. Optionally, in this embodiment, the head-mounted display device 100 may further include a second SMA element 150. The second SMA element 150 is connected between the base 110 and the braking element 140, and is used to actuate the braking element 140 to move between the braking position L12 and the movable position L14. In other embodiments, a general elastic element or other mechanical structures may also be used and replace the second SMA element 150 to actuate the braking element 140 to move between the braking position L12 and the movable position L14.

When the head-mounted display device 100 is worn, the first SMA element 130 may be used to adjust a position of the first lens 122, to then change the distance between the first lens 122 and the second lens 124. After appropriate adjustment, it can be ensured that both eyes may be aligned with the first lens 122 and the second lens 124, to then reduce blur and out-of-focus situations in images and improve the visual experience. Moreover, since the first SMA element 130 adjusts the position of the first lens 122 in an electronically controlled manner, a more precise and accurate adjustment result may be obtained. Compared with some existing head-mounted display devices that adopt motors to adjust the interpupillary distance, the adjustment mechanism of this embodiment occupies much less volume and is much more lightweight.

When a user intends to execute the function of adjusting the interpupillary distance, the head-mounted display device 100 may execute the corresponding software. The software, for example, provides an interface for the user to decide to increase or decrease the distance between the first lens 122 and the second lens 124. According to the instructions of the user, the first SMA element 130 is powered on and heated to change the length thereof, to then drive the first lens 122 to move to change the distance between the first lens 122 and the second lens 124. Then, the user may adjust the distance between the first lens 122 and the second lens 124 again according to the change in the clarity of the picture seen until the user sees the clearest picture.

In an embodiment of the invention, the head-mounted display device 100 further includes a linking mechanism 170 disposed on the base 110, coupled to the first lens 122 and the second lens 124, and used to drive the second lens 124 to move when the first lens 122 moves. The linking mechanism 170 may include two serrations 170A and 170B and a gear 170C. For example, the serration 170A is connected to the first lens 122, the serration 170B is connected to the second lens 124, and both are engaged with the gear 170A. When the first lens 122 moves in a direction approaching the second lens 124, the serration 170A connected to the first lens 122 drives the gear 170C to rotate, and the gear 170C drives the serration 170B connected to the second lens 124 to move, so that the second lens 124 moves in a direction approaching the first lens 122 synchronously. When the first lens 122 moves in a direction departing from the second lens 124, the serration 170A connected to the first lens 122 drives the gear 170C to rotate, and the gear 170C drives the serration 170B connected to the second lens 124 to move, so that the second lens 124 moves in a direction away from the first lens 122 synchronously.

In this embodiment, the first SMA element 130 is connected between the base 110 and the first lens 122, so the first SMA element 130 may drive the first lens 122 to move relative to the base 110. Moreover, through the linking mechanism 170, the first lens 122 drives the second lens 124 to move relative to the base 110.

In this embodiment, the braking element 140 has a pivotal end 142, a first bump 144, and a braking end 146. The second SMA element 150 is connected between the base 110 and the first bump 144. After being powered on and heated, the second SMA element 150 contracts to actuate the braking element 140 to rotate toward the movable position L14. For example, during contraction, the second SMA element 150 may drive the first bump 144 to move from the position in FIG. 1 rightward to the position as shown in FIG. 2. At the same time, the braking element 140 also rotates in a counterclockwise direction in FIG. 2, so that the braking end 146 leaves the first lens 122, and the first lens 122 is movable.

In this embodiment, the head-mounted display device 100 may further include a third SMA element 180E connected between the base 110 and the first bump 144. After being powered on and heated, the third SMA element 180E contracts to actuate the braking element 140 to rotate toward the braking position L12. For example, during contraction after being powered on and heated, the third SMA element 180E may drive the first bump 144 to move from the position in FIG. 2 leftward to the position as shown in FIG. 1. At the same time, the braking element 140 also rotates in a clockwise direction in FIG. 1, so that the braking end 146 is finally in contact with and brakes the first lens 122. In other embodiments, the third SMA element 180E may also be replaced with a general elastic element.

In this embodiment, the head-mounted display device 100 further includes a positioning element 190 disposed on the base 110 and having a positioning groove 192. The braking element 140 further has a second bump 148. The second bump 148 is located at a first end 192A of the positioning groove 192 when the braking element 140 is at the braking position L12. The second bump 148 is located at a second end 192B of the positioning groove 192 when the braking element 140 is at the movable position L14. In this embodiment, a neck portion 192C of the positioning groove 192 is located between the first end 192A and the second end 192B. A width of the neck portion 192C is slightly less than a width of the second bump 148. Accordingly, if the second bump 148 is intended to pass through the neck portion 192C, it is required to apply a sufficient force to widen the neck portion 192C. In other words, when the second bump 148 is located at the first end 192A of the positioning groove 192, the positioning element 190 may provide an appropriate force to position the braking element 140 at the braking position L12. When the second bump 148 is located at the second end 192B of the positioning groove 192, the positioning element 190 may provide an appropriate force to position the braking element 140 at the movable position L14. The positioning element 190 may also be provided with an opening groove 194 beside the positioning groove 192 to weaken the structural strength around the positioning groove 192 and facilitate deformation of the neck portion 192C.

In this embodiment, after passing through the neck portion 192C, the second bump 148 can be stably retained at the first end 192A or the second end 192B. In other words, when the second SMA element 150 and the third SMA element 180E are powered off, the second bump 148 can be stably retained at the first end 192A or the second end 192B to save power consumption and prolong the service lifespans of the second SMA element 150 and the third SMA element 180E.

Figure 3:
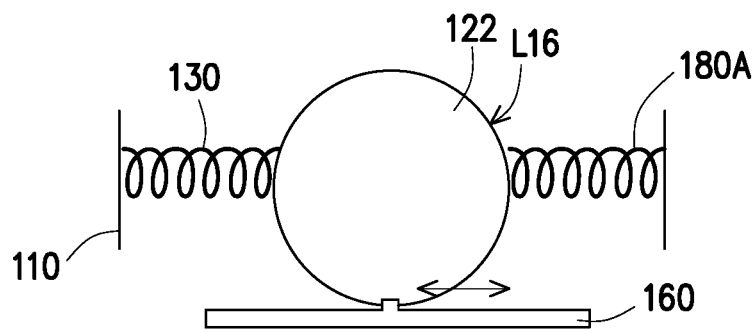
FIG. 3 is a schematic diagram illustrating a movement mechanism of a first lens of the head-mounted display device in FIG. 1.

FIG. 3 is a schematic diagram illustrating a movement mechanism of a first lens of the head-mounted display device in FIG. 1. With reference to FIG. 1 and FIG. 3, in this embodiment, the head-mounted display device may further include a position sensor 160 assembled to the base 110 and used to sense the position of the first lens 122. For example, the position sensor 110 may be a variable resistor, an optical sensor, or a Hall sensor. The head-mounted display device 100 may memorize interpupillary distances of different users. When a user selects a previously stored interpupillary distance and intends to perform adjustment, the first SMA element 130 may be powered on and heated to drive the first lens 122 to move. When the position sensor 160 senses that the first lens 122 has moved to the memory position, the first SMA element 130 may be stopped from driving the first lens 122, and the second SMA element 150 may be powered off, to facilitate actuating the braking element 140 to return to the braking position L12 to brake the first lens 122.

In this embodiment, the head-mounted display device 100 further includes a restoring element 180A connected between the base 110 and the first lens 122 and used to maintain the first lens 122 at an original position when the first SMA element 130 is in a powered-off state. Here, the original position is not limited to a specific position. When the first SMA element 130 is in a powered-off state, where the first lens 122 is applied with forces by the first SMA element 130 and the restoring element 180A simultaneously to achieve force balance, such a position is the original position. The original position changes under the impact of various parameters, for example, materials, dimensions, and the like, of the restoring element 180A and the first SMA element 130. In addition, the description that the restoring element 180A maintains the first lens 122 at the original position refers to that the first lens 122 tends to move toward the original position and stop at the original position. Nonetheless, it is also possible that the first lens 122 does not reach the original position under the effect of other external forces.

Figure 4:
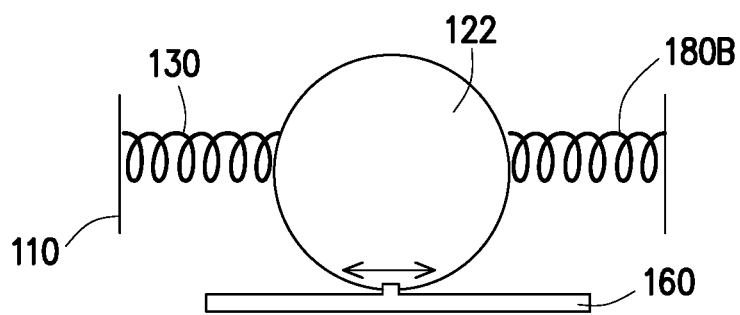
FIG. 4 is a schematic diagram illustrating a movement mechanism of a first lens of a head-mounted display device of another embodiment of the invention.

FIG. 4 is a schematic diagram illustrating a movement mechanism of a first lens of a head-mounted display device of another embodiment of the invention. With reference to FIG. 4, the head-mounted display device of this embodiment is similar to the head-mounted display device 100 of FIG. 1, and only their differences are to be described here. In the head-mounted display device of this embodiment, only some elements are shown in FIG. 4, and the other elements are the same as those of the head-mounted display device 100 of FIG. 1. In this embodiment, the head-mounted display device further includes a third SMA element 180B connected between the base 110 and the first lens 122 and used with the first SMA element 130 to move the first lens 122. That is, the first SMA element 130 may be electronically controlled to be changed to move the first lens 122, and the length of the third SMA element 180B may also be electronically controlled to be changed to move the first lens 122. For example, the first SMA element 130 is powered on and heated to contract to pull the first lens 122 to move leftward. Alternatively, the third SMA element 180B is powered on and heated to contract to pull the first lens 122 to move rightward.

Figure 5:
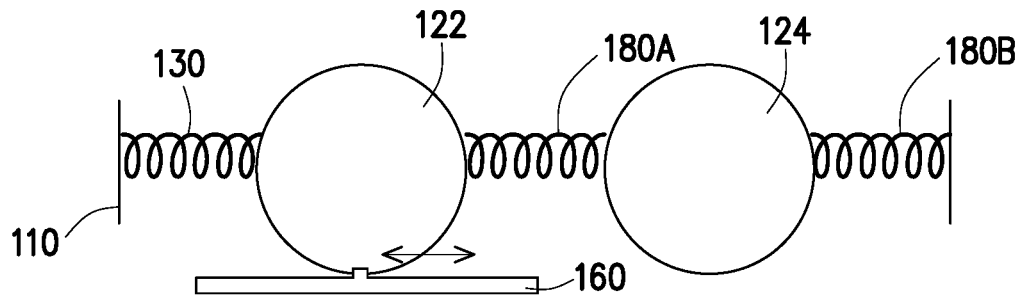
FIG. 5 is a schematic diagram illustrating a movement mechanism of a first lens of a head-mounted display device of yet another embodiment of the invention.

FIG. 5 is a schematic diagram illustrating a movement mechanism of a first lens of a head-mounted display device of yet another embodiment of the invention. With reference to FIG. the head-mounted display device of this embodiment is similar to the head-mounted display device of FIG. 3, and only their differences are to be described here. In the head-mounted display device of this embodiment, only some elements are shown in FIG. 5, and the other elements are the same as those of the head-mounted display device 100 of FIG. 1. In this embodiment, the head-mounted display device further includes a third SMA element 180B and a restoring element 180A. The first SMA element 130 is connected between the base 110 and the first lens 122. The third SMA element 180B is connected between the base 110 and the second lens 124. The restoring element 180A is connected between the second lens 124 and the first lens 122. The third SMA element 180B is used to move the second lens 124. The restoring element 180A is used to maintain the first lens 122 and the second lens 124 at an original position when the first SMA element 130 and the third SMA element 180B are in a powered-off state. Since the first SMA element 130 is in charge of moving the first lens 122, and the third SMA element 180B is in charge of moving the second lens 124, the head-mounted display device of this embodiment is not required to be provided with the linking element 170 as in the embodiment of FIG. 1. Moreover, when the positions of left and right eyes of the user are not symmetrical, the first lens 122 and the second lens 124 may also respectively move to the optimal positions.

Figure 6:
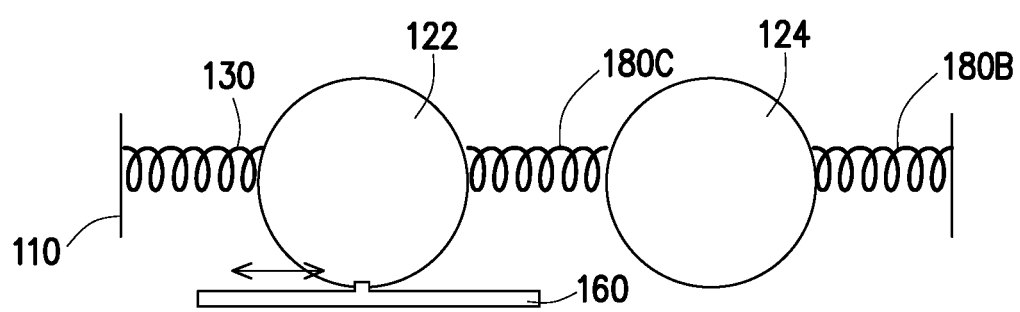
FIG. 6 is a schematic diagram illustrating a movement mechanism of a first lens of a head-mounted display device of still another embodiment of the invention.

FIG. 6 is a schematic diagram illustrating a movement mechanism of a first lens of a head-mounted display device of still another embodiment of the invention. With reference to FIG. 6, the head-mounted display device of this embodiment is similar to the head-mounted display device of FIG. 5, and only their differences are to be described here. In the head-mounted display device of this embodiment, only some elements are shown in FIG. 6, and the other elements are the same as those of the head-mounted display device 100 of FIG. 1. In this embodiment, the head-mounted display device further includes a third SMA element 180B and a fourth SMA element 180C. The first SMA element 130 is connected between the base 110 and the first lens 122. The third SMA element 180B is connected between the base 110 and the second lens 124. The fourth SMA element 180C is connected between the second lens 124 and the first lens 122. The first SMA element 130, the third SMA element 180B, and the fourth SMA element 180C are used to move the first lens 122 and the second lens 124. That is, the lengths of the first SMA element 130, the third SMA element 180B, and the fourth SMA element 180C may be electronically controlled to be changed to move the first lens 122 and the second lens 124. The head-mounted display device of this embodiment may be similarly not required to be provided with the linking element 170 as in the embodiment of FIG. 1.

Figure 7:
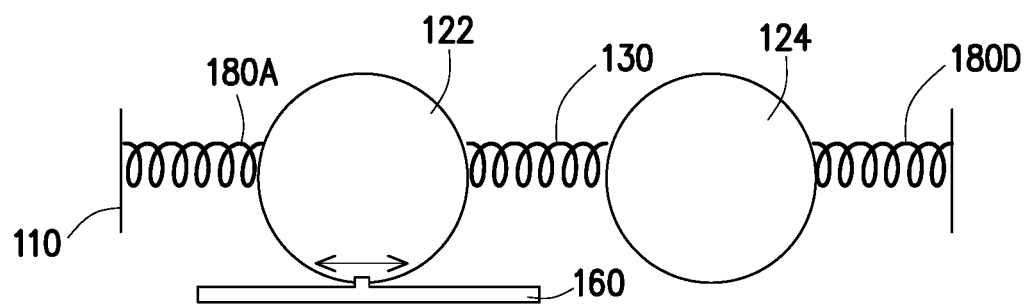
FIG. 7 is a schematic diagram illustrating a movement mechanism of a first lens of a head-mounted display device of yet another embodiment of the invention.

FIG. 7 is a schematic diagram illustrating a movement mechanism of a first lens of a head-mounted display device of yet another embodiment of the invention. With reference to FIG. 7, the head-mounted display device of this embodiment is similar to the head-mounted display device of FIG. 5, and only their differences are to be described here. In the head-mounted display device of this embodiment, only some elements are shown in FIG. 7, and the other elements are the same as those of the head-mounted display device 100 of FIG. 1. In this embodiment, the head-mounted display device further includes a restoring element 180A and a restoring element 180D. The restoring element 180A is connected between the base 110 and the first lens 122. The restoring element 180D is connected between the base 110 and the second lens 124. The first SMA element 130 is connected between the second lens 124 and the first lens 122. The first SMA element 130 is used to move the first lens 122 and the second lens 124. The restoring element 180A and the restoring element 180D are used to maintain the first lens 122 and the second lens 124 at an original position when the first SMA element 130 is in a powered-off state. The head-mounted display device of this embodiment may be similarly not required to be provided with the linking element 170 as in the embodiment of FIG. 1.

In summary of the foregoing, in the head-mounted display device of the application, the interpupillary distance is adjusted by the SMA element, which provides the convenience, precision and accuracy of electronic control, and can reduce the volume and weight of the entire adjustment mechanism.

What is claimed is:
1. A head-mounted display device comprising:
a base:
a first lens and a second lens movably disposed on the base;
a first shape memory alloy element connected between the base and the first lens or connected between the second lens and the first lens, and used to move the first lens and adjust a distance between the first lens and the second lens;
a braking element disposed on the base, wherein the braking element brakes the first lens at a braking position, and the braking element is separated from the first lens at a movable position; and
a second shape memory alloy element connected between the base and the braking element and used to actuate the braking element to move between the braking position and the movable position,
wherein the braking element has a pivotal end, a first bump, and a braking end, the second shape memory alloy element is connected between the base and the first bump, and the second shape memory alloy element contracts after being powered on and heated to actuate the braking element to rotate toward the braking position.

2. The head-mounted display device according to claim 1, further comprising a position sensor assembled to the base and used to sense a position of the first lens.

3. The head-mounted display device according to claim 1, further comprising a linking element, the linking element disposed on the base, coupled to the first lens and the second lens, and used to drive the second lens to move when the first lens moves, wherein the first shape memory alloy element is connected between the base and the first lens.

4. The head-mounted display device according to claim 3, further comprising a restoring element connected between the base and the first lens and used to maintain the first lens at an original position when the first shape memory alloy element is in a powered-off state.

5. The head-mounted display device according to claim 3, further comprising a third shape memory alloy element connected between the base and the first lens and used with the first shape memory alloy element to move the first lens.

6. The head-mounted display device according to claim 1, further comprising a third shape memory alloy element and a restoring element, wherein the first shape memory alloy element is connected between the base and the first lens, the third shape memory alloy element is connected between the base and the second lens, and the restoring element is connected between the second lens and the first lens, and wherein the third shape memory alloy element is used to move the second lens, and the restoring element is used to maintain the first lens and the second lens at an original position when the first shape memory alloy element and the third shape memory alloy element are in a powered-off state.

7. The head-mounted display device according to claim 1, further comprising a third shape memory alloy element and a fourth shape memory alloy element, wherein the first shape memory alloy element is connected between the base and the first lens, the third shape memory alloy element is connected between the base and the second lens, and the fourth shape memory alloy element is connected between the second lens and the first lens, and wherein the first shape memory alloy element, the third shape memory alloy element, and the fourth shape memory alloy element are used to move the first lens and the second lens.

8. The head-mounted display device according to claim 1, further comprising a first restoring element and a second restoring element, wherein the first restoring element is connected between the base and the first lens, the second restoring element is connected between the base and the second lens, and the first shape memory alloy element is connected between the second lens and the first lens, and wherein the first shape memory alloy element is used to move the first lens and the second lens, and the first restoring element and the second restoring element are used to maintain the first lens and the second lens at an original position when the first shape memory alloy element is in a powered-off state.

9. The head-mounted display device according to claim 1, further comprising a positioning element disposed on the base and having a positioning groove, wherein the braking element further has a second bump, the second bump is located at a first end of the positioning groove when the braking element is at the braking position, and the second bump is located at a second end of the positioning groove when the braking element is at the movable position.

10. The head-mounted display device according to claim 9, wherein a neck portion of the positioning groove is located between the first end and the second end, and a width of the neck portion is slightly less than a width of the second bump.

11. The head-mounted display device according to claim 1, further comprising a third shape memory alloy element connected between the base and the first bump, wherein the third shape memory alloy element contracts after being powered on and heated to actuate the braking element to rotate toward the movable position.

* * * * *